US011017056B2

(12) United States Patent
Li

(10) Patent No.: US 11,017,056 B2
(45) Date of Patent: *May 25, 2021

(54) ABNORMAL DATA DETECTION

(71) Applicant: Advanced New Technologies Co., Ltd., Grand Cayman (KY)

(72) Inventor: Longfei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 166 days.

This patent is subject to a terminal disclaimer.

(21) Appl. No.: 16/257,741

(22) Filed: Jan. 25, 2019

(65) Prior Publication Data

US 2019/0236114 A1 Aug. 1, 2019

(30) Foreign Application Priority Data

Jan. 26, 2018 (CN) .......................... 201810078842.7

(51) Int. Cl.
*G06F 17/18* (2006.01)
*G06F 16/215* (2019.01)
*G06K 9/62* (2006.01)

(52) U.S. Cl.
CPC ............ *G06F 17/18* (2013.01); *G06F 16/215* (2019.01); *G06K 9/6262* (2013.01); *G06K 9/6284* (2013.01)

(58) Field of Classification Search
CPC combination set(s) only.
See application file for complete search history.

(56) References Cited

U.S. PATENT DOCUMENTS

| 6,023,774 | A | 2/2000 | Minagawa |
| 7,099,320 | B1 | 8/2006 | Salerno |
| 2003/0117279 | A1 | 6/2003 | Ueno et al. |
| 2004/0142351 | A1* | 7/2004 | Dozmorov ............. G16B 25/00 435/6.12 |

(Continued)

FOREIGN PATENT DOCUMENTS

| CN | 103164318 | 6/2013 |
| CN | 105589796 | 5/2016 |

(Continued)

OTHER PUBLICATIONS

International Search Report and Written Opinion in International Application No. PCT/US2019/015182, dated Apr. 9, 2019, 12 pages.

(Continued)

*Primary Examiner* — Michael J Dalbo
(74) *Attorney, Agent, or Firm* — Fish & Richardson P.C.

(57) ABSTRACT

This specification describes techniques for detecting abnormal data in a data set. One example method includes obtaining, by a data processing platform, a to-be-validated data group including to-be-validated data corresponding to a predetermined feature; obtaining, by the data processing platform, a comparison data group including historical data associated with the to-be-validated data group, wherein the historical data and the to-be-validated data are from a same data source; performing, by the data processing platform, a two-group significance test on the to-be-validated data group and the comparison data group to generate a test result; and determining, by the data processing platform, whether there is abnormal data in the to-be-validated data group based on the test result.

17 Claims, 9 Drawing Sheets

(56) References Cited

U.S. PATENT DOCUMENTS

| | | | |
|---|---|---|---|
| 2010/0185414 A1 | 7/2010 | Yamamoto | |
| 2012/0101828 A1* | 4/2012 | Leibon | G06Q 40/02 |
| | | | 705/1.1 |
| 2014/0257757 A1 | 9/2014 | Sonderegger | |
| 2014/0298098 A1 | 10/2014 | Poghosyan et al. | |
| 2016/0110497 A1 | 4/2016 | Dzakula et al. | |
| 2017/0012775 A1 | 1/2017 | Lafer | |
| 2019/0125634 A1* | 5/2019 | Linder | A61K 8/894 |
| 2019/0234965 A1* | 8/2019 | Pussinen | G01N 33/68 |
| 2020/0133999 A1 | 4/2020 | Li | |

FOREIGN PATENT DOCUMENTS

| | | | |
|---|---|---|---|
| CN | 105589796 A | * | 5/2016 |
| CN | 105700989 | | 6/2016 |
| CN | 106202389 | | 12/2016 |
| TW | M334411 | | 6/2008 |
| TW | M508860 | | 9/2015 |

OTHER PUBLICATIONS

PCT International Preliminary Report on Patentability in International Appln No. PCT/US2019/015182, dated Apr. 4, 2020, 10 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT Written Opinion of the International Preliminary Examining Authority in International Application No. PCT/US2019/015182, dated Dec. 18, 2019, 6 pages.

\* cited by examiner

| t critical value table | | | | | | |
|---|---|---|---|---|---|---|
| Probability P | | | | | | |
| Degree of freedom v | One-sided test: 0.25<br>Two-sided test: 0.5 | 0.05<br>0.10 | 0.025<br>0.05 | 0.01<br>0.02 | 0.005<br>0.010 | 0.0025<br>0.0050 |
| 1 | 1.000 | 6.314 | 12.706 | 31.821 | 63.657 | 127.321 |
| 2 | 0.816 | 2.920 | 4.303 | 6.965 | 9.925 | 14.089 |
| 3 | 0.765 | 2.353 | 3.182 | 4.540 | 5.841 | 7.453 |
| 4 | 0.741 | 2.132 | 2.776 | 3.747 | 4.604 | 5.597 |
| 31 | 0.683 | 1.696 | 2.040 | 2.453 | 2.744 | 3.022 |
| 32 | 0.682 | 1.694 | 2.037 | 2.449 | 2.738 | 3.015 |
| ooo | ooo | ooo | ooo | ooo | ooo | ooo |
| 34 | 0.682 | 1.691 | 2.032 | 2.441 | 2.728 | 3.002 |

FIG. 4

ABNORMAL DATA DETECTION

CROSS-REFERENCE TO RELATED APPLICATIONS

This application claims priority to Chinese Patent Application No. 201810078842.7, filed on Jan. 26, 2018, which is hereby incorporated by reference in its entirety.

TECHNICAL FIELD

One or more implementations of the present specification relate to the field of data processing, and in particular, to a method and an apparatus for determining abnormal data.

BACKGROUND

As the Internet upgrades, data is more frequently exchanged and shared between different platforms. For example, a bank or a financial platform sends transaction data of a plurality of users to another related platform for data analysis. However, in consideration of security and confidentiality, each platform usually performs privacy protection processing on data before sending the data to other platforms for processing. The data obtained after such processing loses service meanings of the data. After the receiving platform receives the data, it is difficult for the receiving platform to determine whether there is an exception in the data based on service rules. For example, whether there is a null value or an exception in the data.

In addition, in the big data background, the data volume exponentially increases, and the service rules keep changing all the time. Therefore, identifying abnormal data by using only the service rules causes heavy workload and incomprehensive identification.

Therefore, a more effective method is needed for determining and alerting abnormal data.

SUMMARY

Implementations of the present specification are intended to provide a more efficient method and apparatus for determining abnormal data, to alleviate disadvantages in the existing technology.

To achieve the previous objective, an aspect of the present specification provides a method for determining abnormal data, including: obtaining a plurality of pieces of data that is to be validated and that corresponds to a predetermined feature as a first data group that is to be validated; obtaining a plurality of pieces of historical data of the data that is to be validated as a comparison data group; performing a first two-group significance test on the first data group that is to be validated and the comparison data group; and determining whether there is abnormal data based on a test result of the first two-group significance test.

In an implementation, in the previous method for determining abnormal data, the obtaining a plurality of pieces of historical data of the data that is to be validated as a comparison data group includes: obtaining a plurality of groups of historical data of the data that is to be validated, performing a second two-group significance test on every two groups of historical data, and determining a group of historical data that has no exception as the comparison data group based on a test result of the second two-group significance test.

In an implementation, the previous method for determining abnormal data further includes: after the determining whether there is abnormal data based on a test result of the first two-group significance test, when determining that there is abnormal data in the first data group that is to be validated, dividing the first data group that is to be validated into a predetermined quantity of second data groups that are to be validated, performing a third two-group significance test on each second data group that is to be validated and the comparison data group, and determining a second data group that is to be validated and that has abnormal data based on a test result of the third two-group significance test.

In an implementation, in the previous method for determining abnormal data, the first two-group significance test, the second two-group significance test, and the third two-group significance test are separately one of the following tests: a t test, a z test, and a t' test.

In an implementation, the previous method for determining abnormal data further includes: before the performing a first two-group significance test on the first data group that is to be validated and the comparison data group, performing same preprocessing on data in the first data group that is to be validated and data in the comparison data group based on a common distribution feature of the first data group that is to be validated and the comparison data group.

In an implementation, in the previous method for determining abnormal data, the preprocessing is one of the following data transformations: a logarithmic transformation, a square root transformation, a reciprocal transformation, and an arcsine square root transformation.

Another aspect of the present specification provides an apparatus for determining abnormal data, including: a first acquisition unit, configured to obtain a plurality of pieces of data that is to be validated and that corresponds to a predetermined feature as a first data group that is to be validated; a second acquisition unit, configured to obtain a plurality of pieces of historical data of the data that is to be validated as a comparison data group; a first testing unit, configured to perform a first two-group significance test on the first data group that is to be validated and the comparison data group; and a first determining unit, configured to determine whether there is abnormal data based on a test result of the first two-group significance test.

In an implementation, the previous apparatus for determining abnormal data further includes: a division unit, configured to divide the first data group that is to be validated into a predetermined quantity of second data groups that are to be validated when the first determining unit determines, based on the test result of the first two-group significance test, that there is abnormal data in the first data group that is to be validated; a second testing unit, configured to perform a third two-group significance test on each second data group that is to be validated and the comparison data group; and a second determining unit, configured to determine a second data group that is to be validated and that has abnormal data based on a test result of the third two-group significance test.

In an implementation, the previous apparatus for determining abnormal data further includes a preprocessing unit, configured to perform same preprocessing on data in the first data group that is to be validated and data in the comparison data group based on a common distribution feature of the first data group that is to be validated and the comparison data group before the first two-group significance test is performed on the first data group that is to be validated and the comparison data group.

Another aspect of the present specification provides a computer-readable storage medium, where instruction code is stored in the computer-readable storage medium, and when the instruction code is executed in a computer, the computer performs the previous method for determining abnormal data.

According to the method and apparatus in the previous implementations, the data exception can be identified more effectively, and then alerting and intervention can be performed.

BRIEF DESCRIPTION OF DRAWINGS

Implementations of the present specification are described with reference to the accompanying drawings, which can make the implementations of the present specification clearer:

FIG. 4 shows an example of a t critical value table;

DESCRIPTION OF IMPLEMENTATIONS

The following describes the implementations of the present specification with reference to the accompanying drawings.

Figure 1:
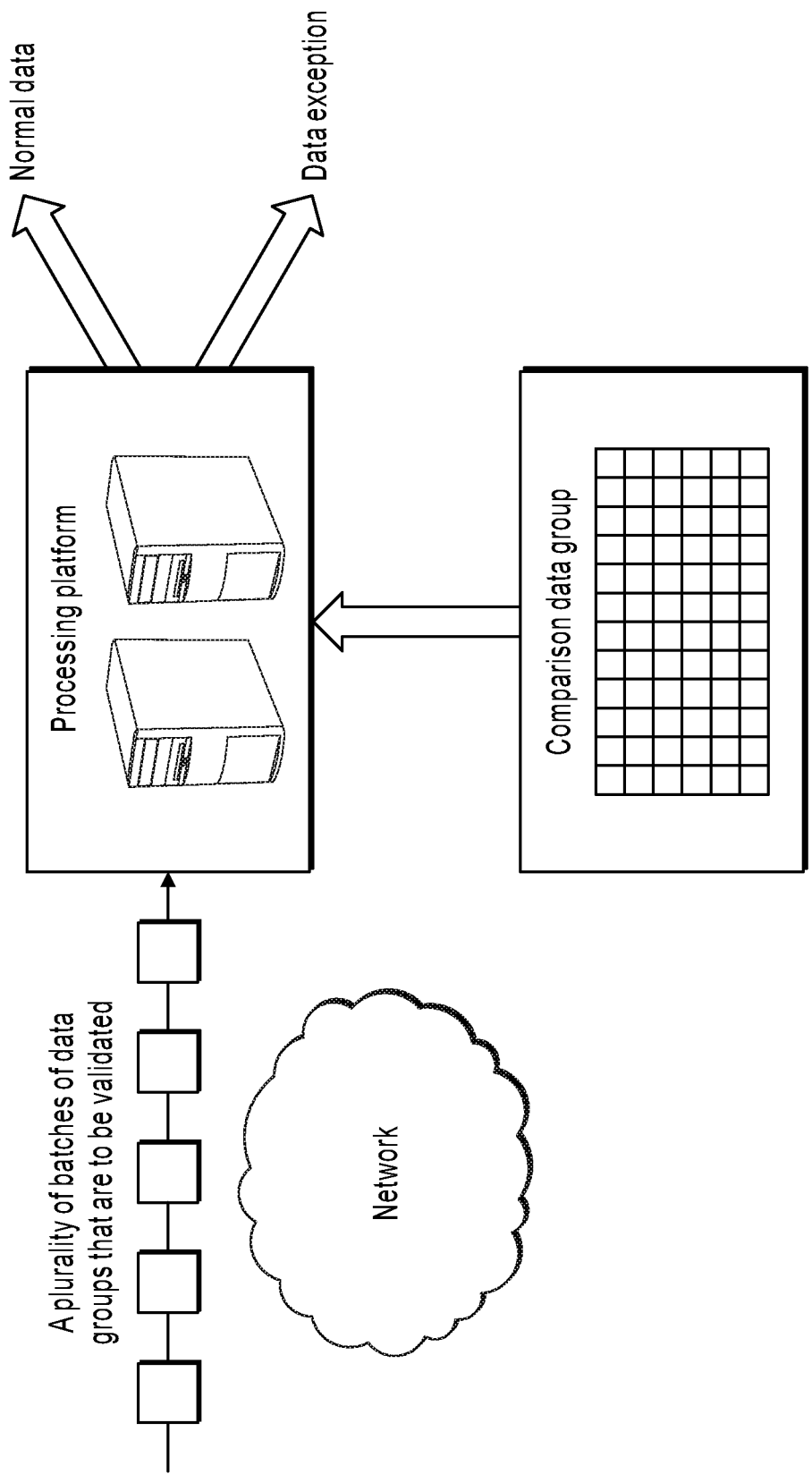
FIG. 1 is a schematic diagram illustrating an implementation disclosed in the present specification.

FIG. 1 is a schematic diagram illustrating an implementation disclosed in the present specification. In FIG. 1, a processing platform (e.g., an ALIPAY server) obtains a plurality of pieces of data that is to be validated and that corresponds to a predetermined feature from a data providing platform as a data group that is to be validated (e.g., a data group that corresponds to user transaction amounts). In addition, the processing platform further obtains a plurality of pieces of historical data of the data that is to be validated as a comparison data group. The historical data also corresponds to the same predetermined feature, and the comparison data group can be provided by the data providing platform in advance. Then, the processing platform performs a two-group significance test on the data group that is to be validated and the comparison data group, and determines whether there is abnormal data based on a test result. If there is no data exception, the processing platform can continue to process the data or send the data to a next service step. If the processing platform determines that there is abnormal data, the processing platform can start alerting, instruct related persons to analyze the cause of the data exception, and trigger related solutions. The following describes a specific implementation process of determining abnormal data.

Figure 2:
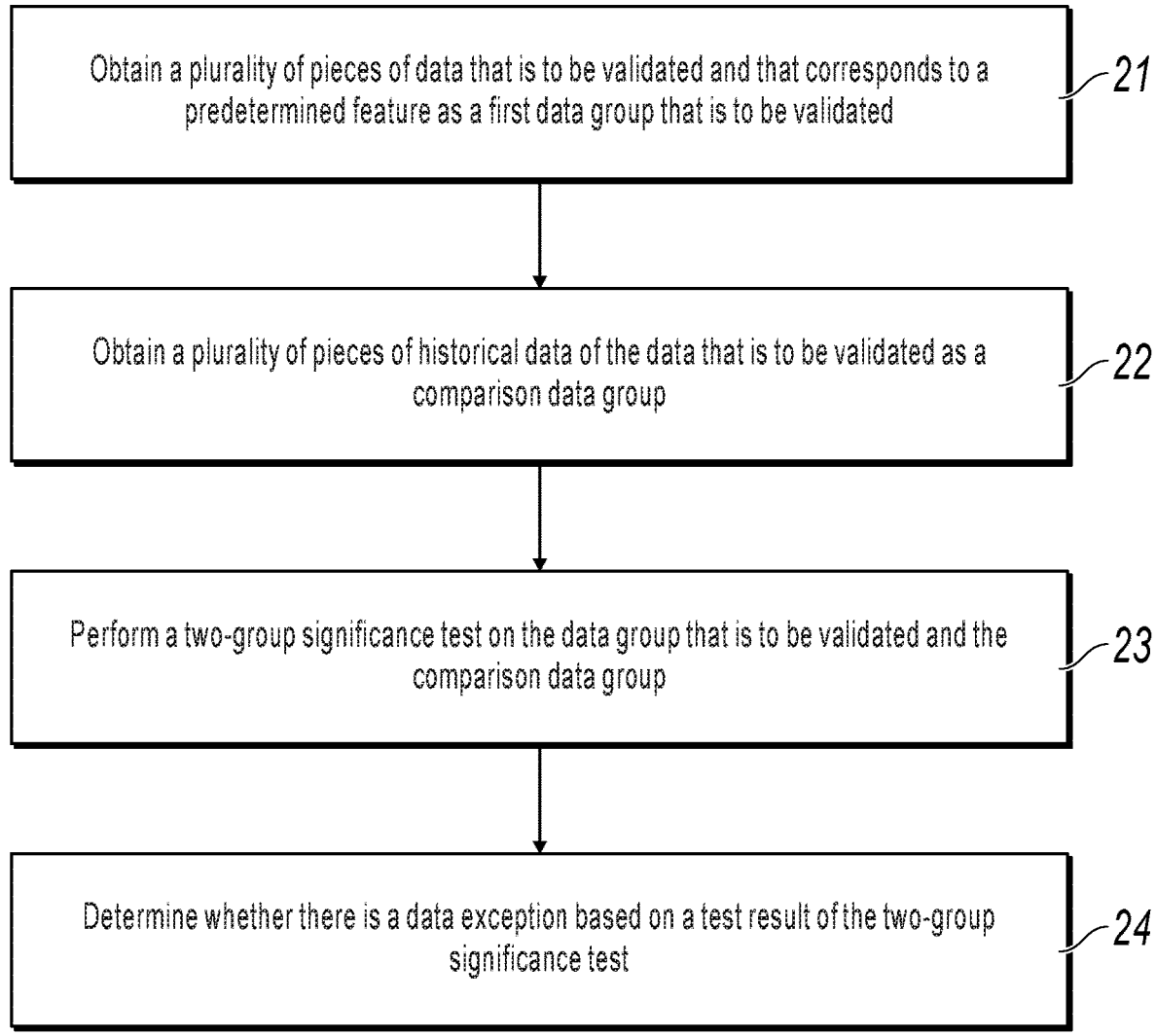
FIG. 2 is a flowchart illustrating a method for determining abnormal data, according to an implementation.

FIG. 2 is a flowchart illustrating a method for determining abnormal data, according to an implementation. The method can be performed by any processing platform that has a computing capability and a processing capability, for example, a server. As shown in FIG. 2, the method includes the following steps. Step 21: Obtain a plurality of pieces of data that is to be validated and that corresponds to a predetermined feature as a first data group that is to be validated. Step 22: Obtain a plurality of pieces of historical data of the data that is to be validated as a comparison data group. Step 23: Perform a two-group significance test on the data group that is to be validated and the comparison data group. Step 24: Determine whether there is abnormal data in the data group that is to be validated based on a test result of the significance test. The following describes execution methods of the previous steps with reference to specific examples.

First, in step 21, the plurality of pieces of data that is to be validated and that corresponds to the predetermined feature are obtained as the first data group that is to be validated.

For example, the processing platform (e.g., an ALIPAY server) obtains the data group that is to be validated and that corresponds to the predetermined feature from a data providing platform (e.g., a bank or a financial platform). The predetermined feature can be, for example, ages, credits, transaction amounts, expenditure amounts, loan amounts, etc. of different users, or expenditure amounts of users whose ages are within a predetermined range. The data providing platform usually sends a plurality of batches of data to the processing platform. Each batch of data, for example, can be data received by the data providing platform in a certain time period, for example, data received in one week or data received in one month. Each batch of data includes a plurality of columns of data corresponding to a plurality of features, for example, one column of data corresponding to user ages, one column of data corresponding to user credits, and one column of data corresponding to user transaction amounts. For example, a magnitude of each batch of data is 10 w, that is, data corresponding to a specific feature (e.g., user transaction amounts) in the data whose magnitude is 10 w can constitute a data group that is to be validated. In an implementation, the data group that is to be validated can include a relatively small amount of data, for example, 20 pieces of data.

When the previous predetermined feature relates to user privacy, the data providing platform encrypts the data before sending the data to the processing platform in consideration of security and confidentiality. The data obtained after such processing loses service meanings of the data. In other words, it is difficult to manually check the data. The data may include many null values and outliers. The null values and outliers may be generated during data collection, or generated during table join (multi-table connection), or generated in various service steps.

In step 22, the plurality of pieces of historical data of the data that is to be validated are obtained as the comparison data group.

Generally, the comparison data group and the previously described data group that is to be validated have the same data source. For example, the data providing platform provides a group of historical data corresponding to the predetermined feature (e.g., user transaction amounts) for the processing platform as the comparison data group. Similarly, when the previous predetermined feature relates to user privacy, the data providing platform encrypts the historical data before sending the historical data to the processing platform. Generally, the historical data is a large amount of data of a same type that is received by the data providing platform in a relatively long time period (e.g., one week or one month). In addition, the data providing platform checks the comparison data group before sending the comparison data group to the processing platform, to ensure that the data is accurate. To be specific, the comparison data group includes no null value or outlier by default. The more data is included in the comparison data group, the more real distribution of samples can be ensured. In an implementation, a magnitude of data volume of the comparison data group is 20 w. In another implementation, the comparison data group can include a relatively small amount of data, for example, 20 pieces of data.

Then, in step S23, the two-group significance test is performed on the data group that is to be validated and the comparison data group.

A person skilled in the existing technology can know that the two-group significance test is as follows: assume that two data groups have the same distribution (e.g., the same population mean), and then whether the hypothesis is reasonable is determined by using sample information. To be specific, whether a difference between the sample and the hypothesis is opportunity variation (accept the hypothesis) or is caused by a mismatch between real population distribution of the hypothesis and real population distribution of the sample (reject the hypothesis) is determined. The two-group significance test includes a t test, a z test, and a t' test, and these tests are applicable to different samples.

Figure 3:
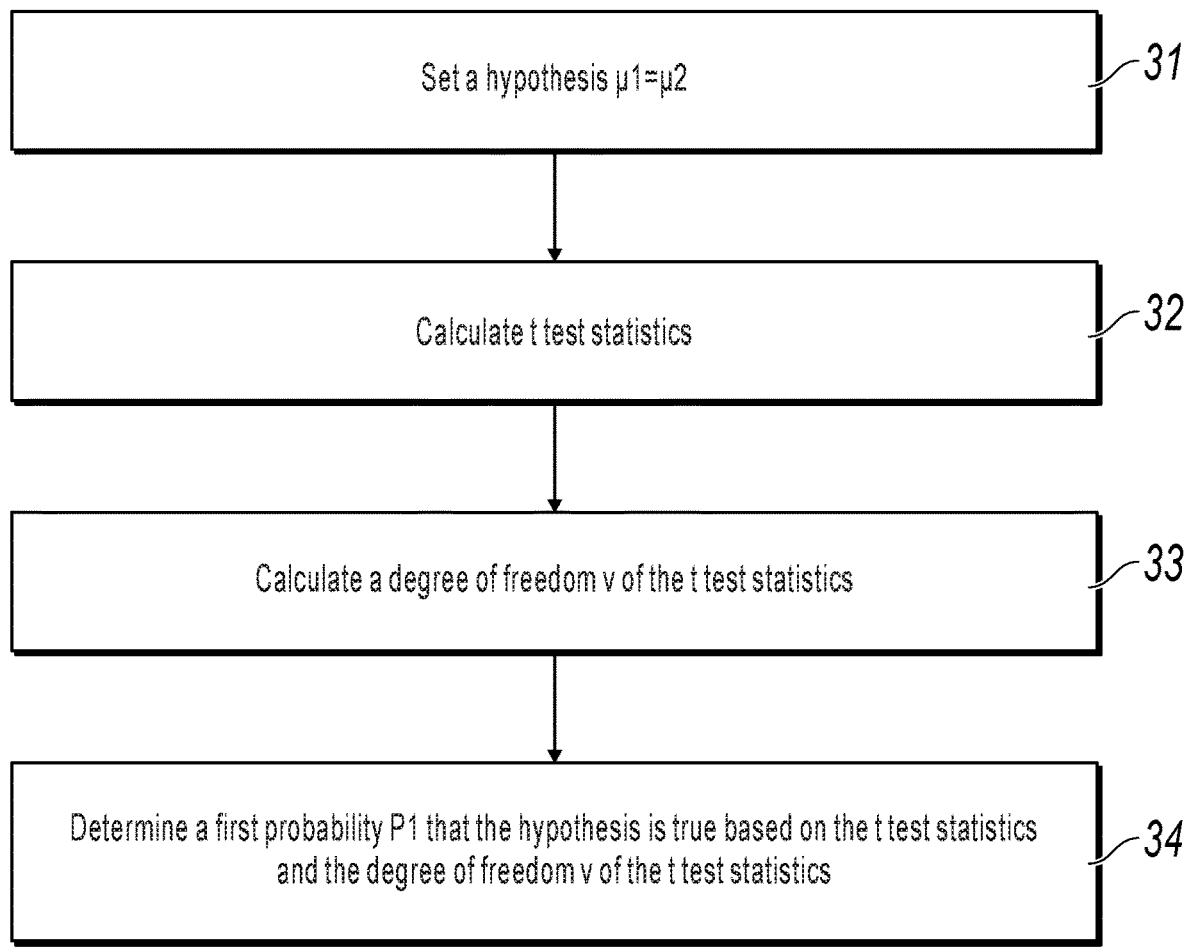
FIG. 3 is a flowchart illustrating a t test, according to an implementation.

In an implementation, because the comparison data group and the data group that is to be validated are from the same data source, the comparison data group and the group that is to be validated have the same population distribution by default. In other words, the comparison data group and the group that is to be validated have homogeneity of variance. In addition, a population of the comparison data group and a population of the data group that is to be validated are, for example, financial platform users. To be specific, a data amount of the populations is large enough, and the populations are normally distributed. Therefore, the t test is performed on the comparison data group and the group that is to be validated. The t test is used for two independent samples. FIG. 3 is a flowchart illustrating a t test, according to an implementation.

In an implementation, the data group that is to be validated includes $n_1$ pieces of data, a sample mean of the $n_1$ pieces of data is $\overline{X}_1$, a sample standard deviation is $S_1$, and a population mean is $\mu 1$. The comparison data group includes $n_2$ pieces of data, a sample mean of the $n_2$ pieces of data is $\overline{X}_2$, a sample standard deviation is $S_2$, and a population mean is $\mu 2$. Here, $n_1$ and $n_2$ are natural numbers. A minimum value of $n_1$ and a minimum value of $n_2$ are 5, and a maximum value of $n_1$ and a maximum value of $n_2$ are not limited. As shown in FIG. 3, that the t test is performed on the data group that is to be validated and the comparison data group includes the following steps:

In step S31, set a hypothesis $\mu 1 = \mu 2$.

In step S32, calculate t test statistics based on the following equation:

$$t = \frac{\overline{X}_1 - \overline{X}_2}{\sqrt{\frac{(n_1 - 1)S_1^2 + (n_2 - 1)S_2^2}{n_1 + n_2 - 2}\left(\frac{1}{n_1} + \frac{1}{n_2}\right)}}.$$

In step S33, calculate a degree of freedom of the t test statistics based on the following equation: $v = n_1 + n_2 - 2$.

In step S34, determine a first probability P1 that the hypothesis $\mu 1 = \mu 2$ is true based on the t test statistics and the degree of freedom v of the t test statistics.

After the t test statistics and the degree of freedom v of the t test statistics are obtained through calculation, a value of P1 can be obtained by looking up a t critical value table. FIG. 4 shows an example of a t critical value table. Here, the t test is a two-sided test. In an implementation, the t test is a one-sided test. As shown in FIG. 4, for example, when the degree of freedom v is 34, and t is equal to 2.032, P=0.05. It can be further seen from FIG. 4 that when t is greater than 2.032, P<0.05. Generally, a degree of confidence α of the two-group significance test is set to 0.05. To be specific, when P≤0.05, the probability that the hypothesis $\mu 1 = \mu 2$ is true is relatively small, and when t>2.032, the probability that the hypothesis $\mu 1 = \mu 2$ is true is smaller.

Figure 5:
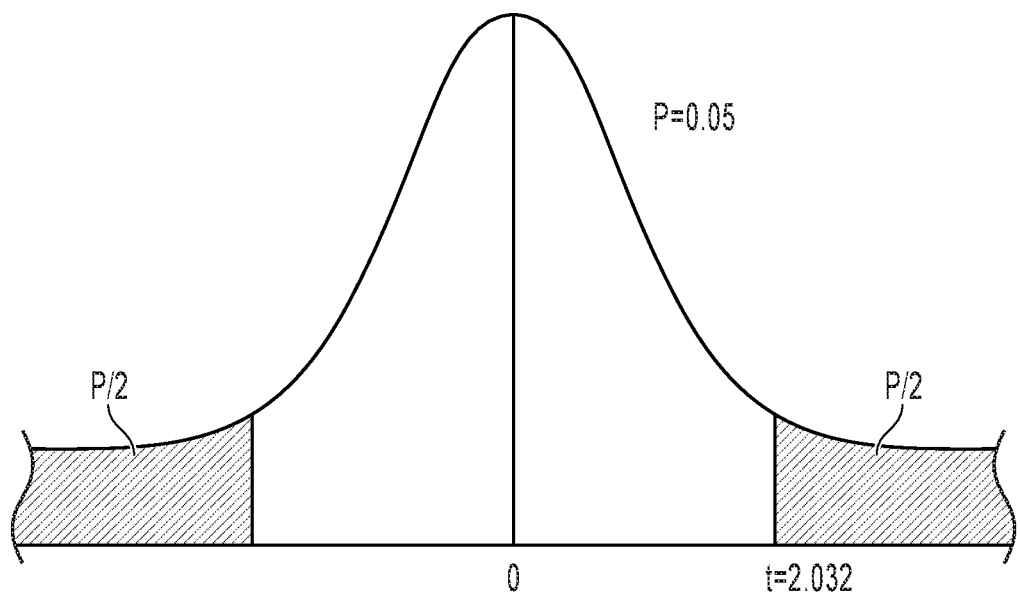
FIG. 5 is a schematic diagram of a curve corresponding to t distribution shown in FIG. 4.

FIG. 5 is a schematic diagram of a curve corresponding to t distribution shown in FIG. 4. A shape of the t distribution curve is related to a value of the degree of freedom v. If the value of the degree of freedom v is smaller, the t distribution curve is flatter, a middle part of the curve is lower, and the two tails of the curve are higher. If the value of the degree of freedom v is larger, the t distribution curve is closer to a normal distribution curve. When the value of the degree of freedom v is infinite, the t distribution curve is a standard normal distribution curve. FIG. 5 is a schematic diagram of a curve corresponding to t distribution when a degree of freedom v is equal to 34 in FIG. 4. When t=2.032, as shown in FIG. 5, the corresponding P=0.05 is a sum of shadow areas on two sides of the t distribution curve. To be specific, a total area under the t distribution curve is 1, and a total area of the shadow areas is 0.05. When t>2.032, the corresponding shadow areas on two sides of the t distribution curve is smaller, in other words, the probability P is smaller.

Figure 6:
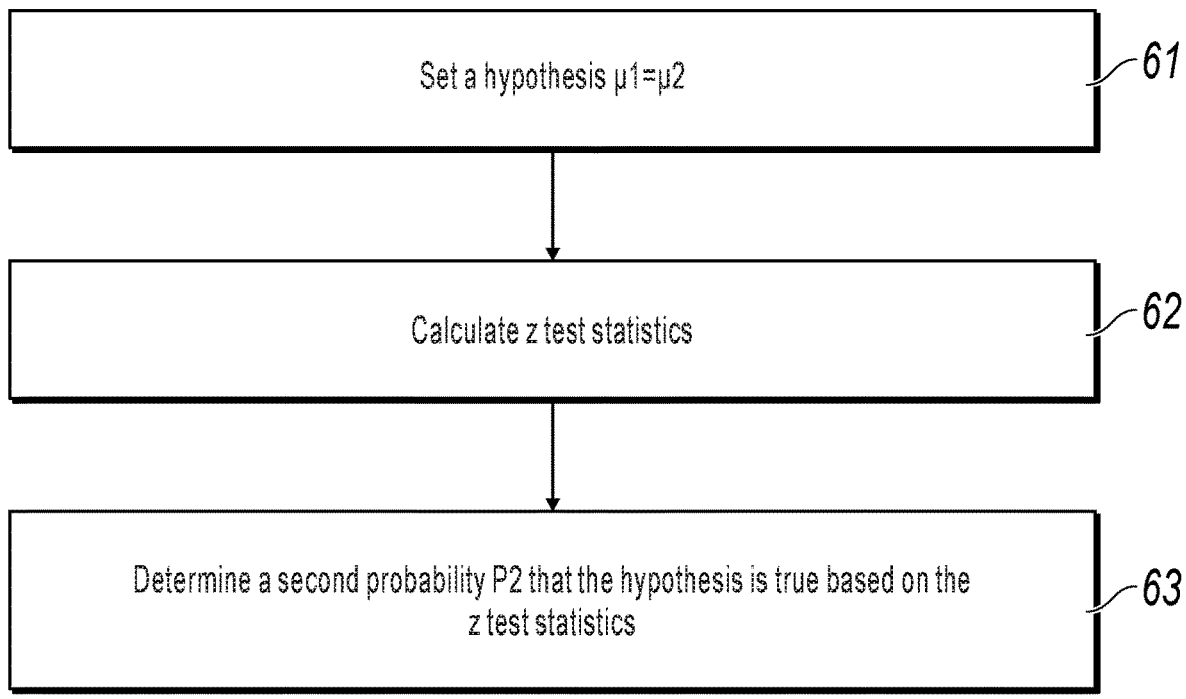
FIG. 6 is a flowchart illustrating a z test, according to an implementation of the present specification.

In an implementation, data population distribution is the same as distribution of the previous t test, to be specific, the comparison data group and the group that is to be validated have same population distribution, the comparison data group and the group that is to be validated have homogeneity of variance, and the population of the comparison data group and the population of the group that is to be validated are normally distributed. In the present implementation, if a quantity of samples of the data group that is to be validated and a quantity of samples of the comparison data group are both relatively large, for example, $n_1$ and $n_2$ are both greater than 30, a z test is performed on the comparison data group and the group that is to be validated. FIG. 6 is a flowchart illustrating a z test, according to an implementation of the present specification. As shown in FIG. 6, the following steps are included.

In step S61, set a hypothesis $\mu 1 = \mu 2$.

In step S62, calculate z test statistics based on the following equation:

$$Z = \frac{\overline{X}_1 - \overline{X}_2}{\sqrt{\left(\frac{S_1^2}{n_1} + \frac{S_2^2}{n_2}\right)}}.$$

In step S63, determine a second probability P2 that the hypothesis $\mu 1 = \mu 2$ is true based on the z test statistics.

After the z test statistics are obtained through calculation, a value of P2 can be obtained by looking up a normal distribution table.

In an implementation, the population of the comparison data group and the population of the group that is to be validated are normally distributed, but it is not sure whether the comparison data group and the group that is to be validated have homogeneity of variance. In this case, before the performing a two-group significance test on the data group that is to be validated and the comparison data group, the method further includes the following: performing a homogeneity of variance test (F test) on the data group that is to be validated and the comparison data group. The F test includes the following: calculating an F test value of the data group that is to be validated and the comparison data group:

$$F = \frac{S_1^2}{S_2^2},$$

and determining the homogeneity of variance of the data group that is to be validated and the comparison data group based on the F value.

Figure 7:
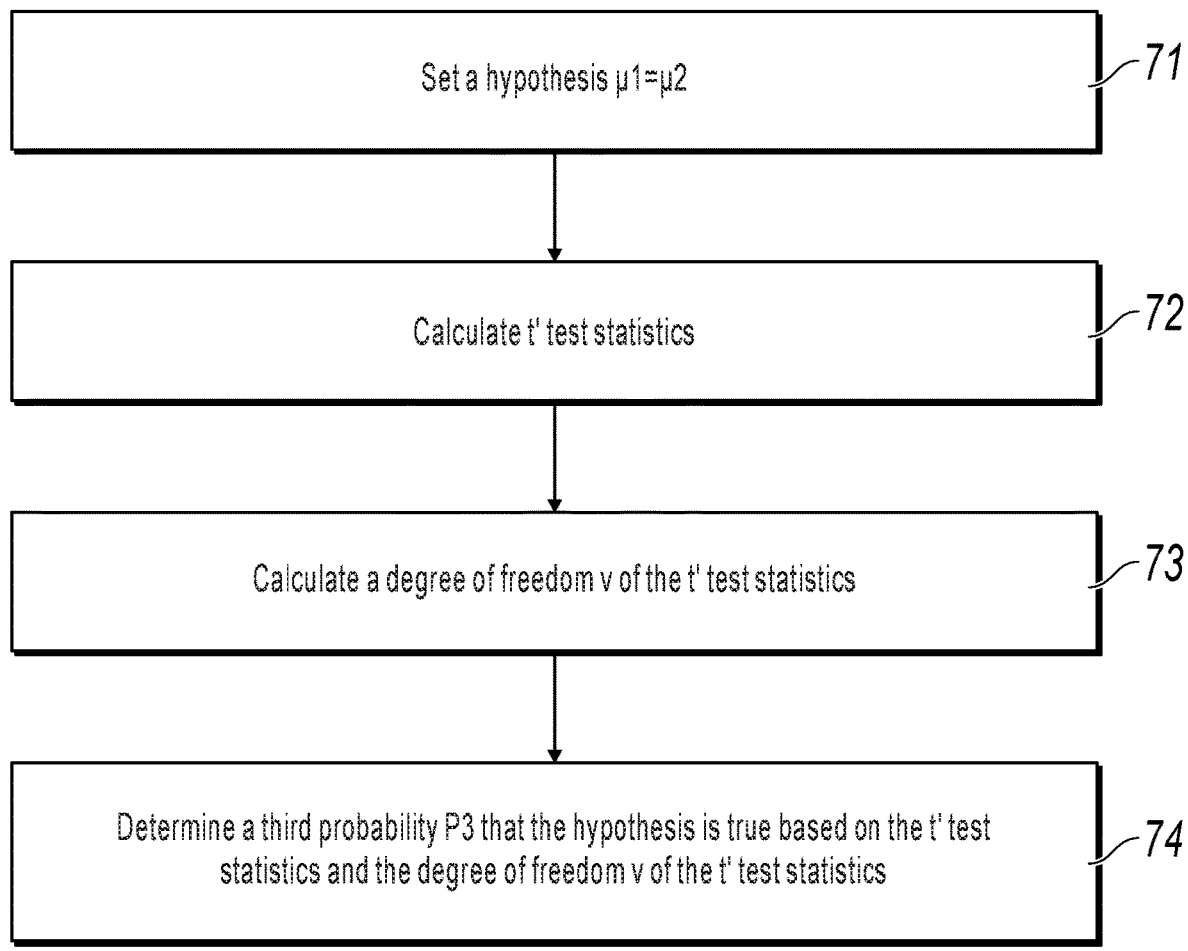
FIG. 7 is a flowchart illustrating a t' test, according to an implementation of the present specification.

When it is determined that a population variance of the data group that is to be validated and a population variance of the comparison data group are heterogeneous, a t' test is performed on the data group that is to be validated and the comparison data group. FIG. 7 is a flowchart illustrating a t' test, according to an implementation of the present specification. As shown in FIG. 7, the t' test includes the following steps.

In step S71, set a hypothesis μ1=μ2.

In step S72, calculate t' test statistics based on the following equation:

$$t' = \frac{\overline{X}_1 - \overline{X}_2}{\sqrt{\left(\frac{S_1^2}{n_1} + \frac{S_2^2}{n_2}\right)}}.$$

In step S73, calculate a degree of freedom v of the t' test statistics based on the following equation:

$$v \approx \frac{\left(\frac{S_1^2}{n_1} + \frac{S_2^2}{n_2}\right)^2}{\frac{S_1^4}{n_1^2(n_1 - 1)} + \frac{S_2^4}{n_2^2(n_2 - 1)}}.$$

In step S74, determine a third probability P3 that the hypothesis μ1=μ2 is true based on the t' test statistics and the degree of freedom v of the t' test statistics.

In an implementation, before the two-group significance test is performed on the data group that is to be validated and the comparison data group, same preprocessing is performed on data in the data group that is to be validated and data in the comparison data group based on a common distribution feature of the data group that is to be validated and the comparison data group. The two-group significance test is applicable to two groups of data whose population distribution is normal distribution. When population distribution of data is skewed distribution, the population distribution of the data can be transformed to normal distribution by performing a corresponding data transformation on the data based on a distribution feature of the data.

In an implementation, the data in the data group that is to be validated and the data in the comparison data group are positively skewed, to be specific, include a large amount of small data and a small amount of large data. In this case, a logarithmic transformation can be performed on the data in the data group that is to be validated and the data in the comparison data group. To be specific, a logarithm to raw data x is calculated, for example, x'=log x or x'=ln x, and a value of x' is used as an analysis variable. Through the logarithmic transformation, the data that is positively skewed is transformed to the data that is normally distributed, and the two groups of data whose variances are heterogeneous satisfy requirements of homogeneity of variance.

In an implementation, the data in the data group that is to be validated and the data in the comparison data group are Poisson distributed. In this case, a square root transformation can be performed on the data in the data group that is to be validated and the data in the comparison data group. To be specific, a square root of raw data x is calculated, for example, x'=√x, and a value of x' is used as an analysis variable. Through the square root transformation, the data that is Poisson distributed or the data that is slightly skewed is transformed to the data that is normally distributed, and the two groups of data whose variances are heterogeneous and whose sample variances are positively correlated with the mean satisfy requirements of homogeneity of variance.

In an implementation, the data in the data group that is to be validated and the data in the comparison data group are severely positively skewed. In this case, a reciprocal transformation can be performed on the data in the data group that is to be validated and the data in the comparison data group. In another implementation, population distribution of the data in the data group that is to be validated and population distribution of the data in the comparison data group are binomial distribution whose population rate is relatively small or whose population rate is relatively large. In this case, an arcsine square root transformation can be performed on the data in the data group that is to be validated and the data in the comparison data group.

In an implementation, normality of the two groups of data can be tested by using any one or more of the following methods: a graphic method (a P-P diagram or a Q-Q diagram), a moment method, a W test, a D test, a Kolmogorov D test, an $x^2$ test, etc.

Referring back to FIG. 2, in step S24, whether there is abnormal data is determined based on the test result of the two-group significance test.

When the probability P (P is P1, P2, or P3) corresponding to the t test, the z test, and the t' test in the description of step S23 is less than or equal to 0.05, the probability that the hypothesis μ1=μ2 is true is relatively small, in other words, a difference between the data group that is to be validated and the comparison data group is significant. When P≤0.01, the probability that the hypothesis μ1=μ2 is true is very small, in other words, a difference between the data group that is to be validated and the comparison data group is very significant.

In an implementation, it is set that both the data group that is to be validated and the comparison data group may have data exceptions when P≤0.01. When the comparison data group is normal data by default, it can be determined that there is abnormal data in the data group that is to be validated.

In an implementation, the obtaining a plurality of pieces of historical data of the data that is to be validated as a comparison data group in step S22 can include the following: obtaining a plurality of groups of historical data of the data that is to be validated, performing a second two-group significance test on every two groups of historical data, and determining a group of historical data that has no exception as the comparison data group based on a test result of the second two-group significance test. The two-group significance test here can also be one of a t test, a z test, or a t' test based on a data status of the historical data groups, and specific calculation steps of the three significance tests are described above. Details are omitted here for simplicity. The two-group significance test is performed on a plurality of historical data groups to further ensure normality of the comparison data group. Therefore, exception validation of the data group that is to be validated can be more accurate.

In an implementation, after whether there is abnormal data is determined based on the test result of the significance test in step S24, if it is determined that there is abnormal data in the data group that is to be validated, the data group that is to be validated can be divided into a predetermined quantity of groups as new data groups that are to be validated, for example, the data group that is to be validated can be divided into two groups or four groups. A two-group significance test is performed on each data group that is to be validated and the comparison data group, and a new data group that is to be validated and that has abnormal data is determined based on a test result. The two-group significance test here can also be one of a t test, a z test, or a t' test based on a data status of the new data group that is to be validated, and specific calculation steps of the three significance tests are described above. Details are omitted here for simplicity.

For example, if a magnitude of the data group that is to be validated is 10 w, directly transferring the data group that is to be validated to manual check upon determining that there is an exception in the data group that is to be validated causes heavy workload. Therefore, the group that is to be validated is divided into, for example, four groups as new data groups that are to be validated, and then the significance test is performed. As such, a new data group that is to be validated and that has abnormal data can be determined. A data magnitude of the new data group that is to be validated is reduced. Therefore, workload of manual check can be reduced.

Figure 8:
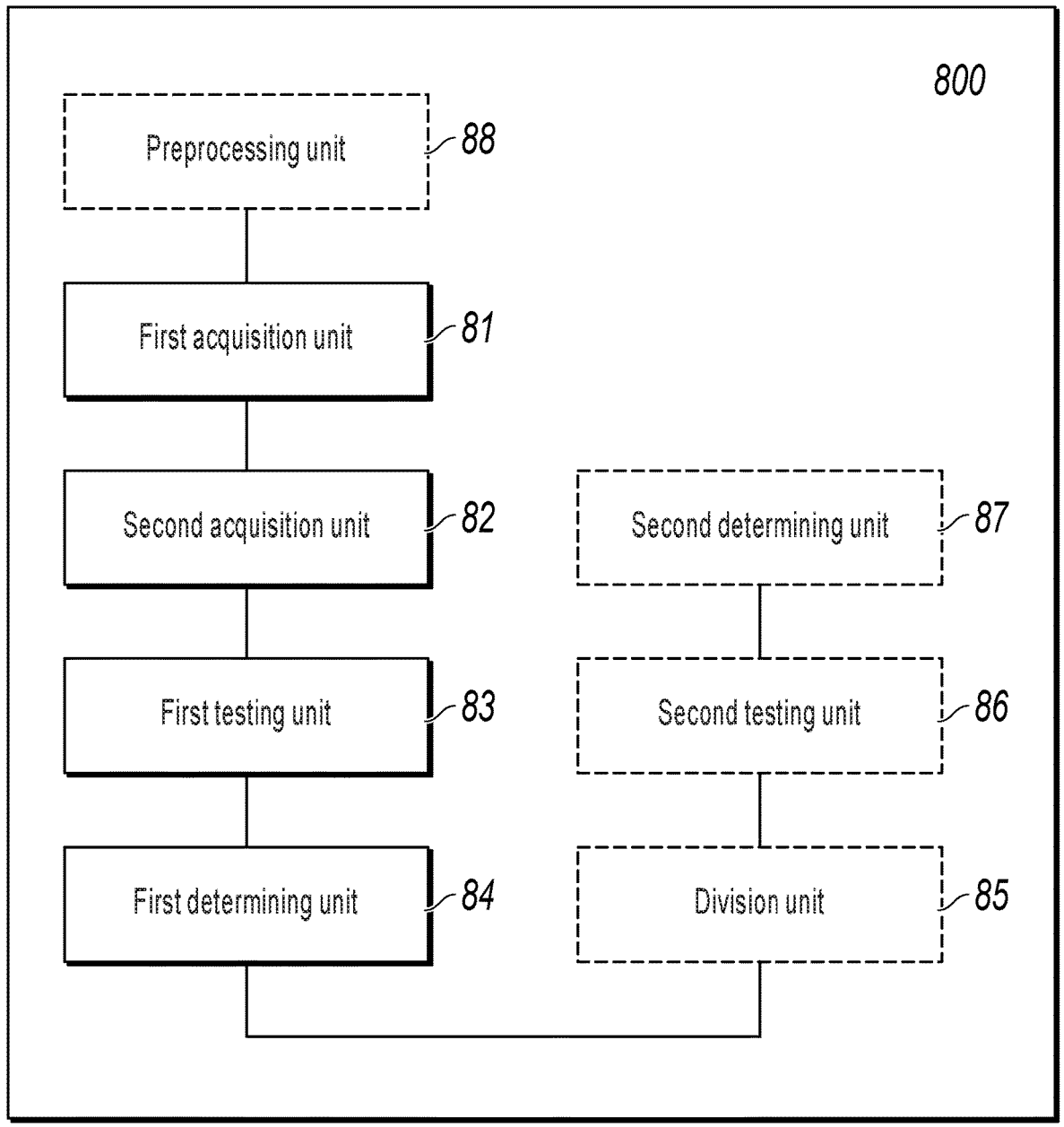
FIG. 8 shows an apparatus 800 for determining abnormal data, according to an implementation of the present specification.

FIG. 8 shows an apparatus 800 for determining abnormal data, according to an implementation of the present specification. As shown in FIG. 8, the apparatus 800 includes the following: a first acquisition unit 81, configured to obtain a plurality of pieces of data that is to be validated and that corresponds to a predetermined feature as a first data group that is to be validated; a second acquisition unit 82, configured to obtain a plurality of pieces of historical data of the data that is to be validated as a comparison data group; a first testing unit 83, configured to perform a two-group significance test on the first data group that is to be validated and the comparison data group; and a first determining unit 84, configured to determine whether there is abnormal data based on a test result of the two-group significance test.

In an implementation, the apparatus 800 further includes the following: a division unit 85, configured to divide the first data group that is to be validated into a predetermined quantity of second data groups that are to be validated when the first determining unit 84 determines, based on the test result of the significance test, that there is abnormal data in the first data group that is to be validated; a second testing unit 86, configured to perform a two-group significance test on each second data group that is to be validated and the comparison data group; and a second determining unit 87, configured to determine a second data group that is to be validated and that has abnormal data based on a test result of the two-group significance test.

In an implementation, the apparatus 800 further includes a preprocessing unit 88, configured to perform same preprocessing on data in the first data group that is to be validated and data in the comparison data group based on a common distribution feature of the first data group that is to be validated and the comparison data group before the two-group significance test is performed on the first data group that is to be validated and the comparison data group.

According to an implementation of another aspect, a computer-readable storage medium is further provided, where a computer program is stored in the computer-readable storage medium, and when the computer program is executed in a computer, the computer performs the previous method for determining abnormal data.

According to the method and apparatus in the precious implementations, even if obtained data loses service meanings due to encryption processing, whether there is abnormal data can be determined by performing a significance test on the data and comparison data, to more effectively identify the data exception and perform alerting and intervention.

A person of ordinary skill in the existing technology can be further aware that, in combination with the examples described in the implementations disclosed in the present specification, units and algorithm steps can be implemented by electronic hardware, computer software, or a combination thereof. To clearly describe interchangeability between the hardware and the software, compositions and steps of each example are described above based on functions. Whether the functions are performed by hardware or software depends on particular applications and design constraint conditions of the technical solutions. A person of ordinary skill in the existing technology can use different methods to implement the described functions for each particular application, but it should not be considered that the implementation goes beyond the scope of the present application.

Steps of methods or algorithms described in the implementations disclosed in the present specification can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the existing technology.

In the described specific implementations, the objective, technical solutions, and benefits of the present disclosure are further described in detail. It should be understood that the descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

Figure 9:
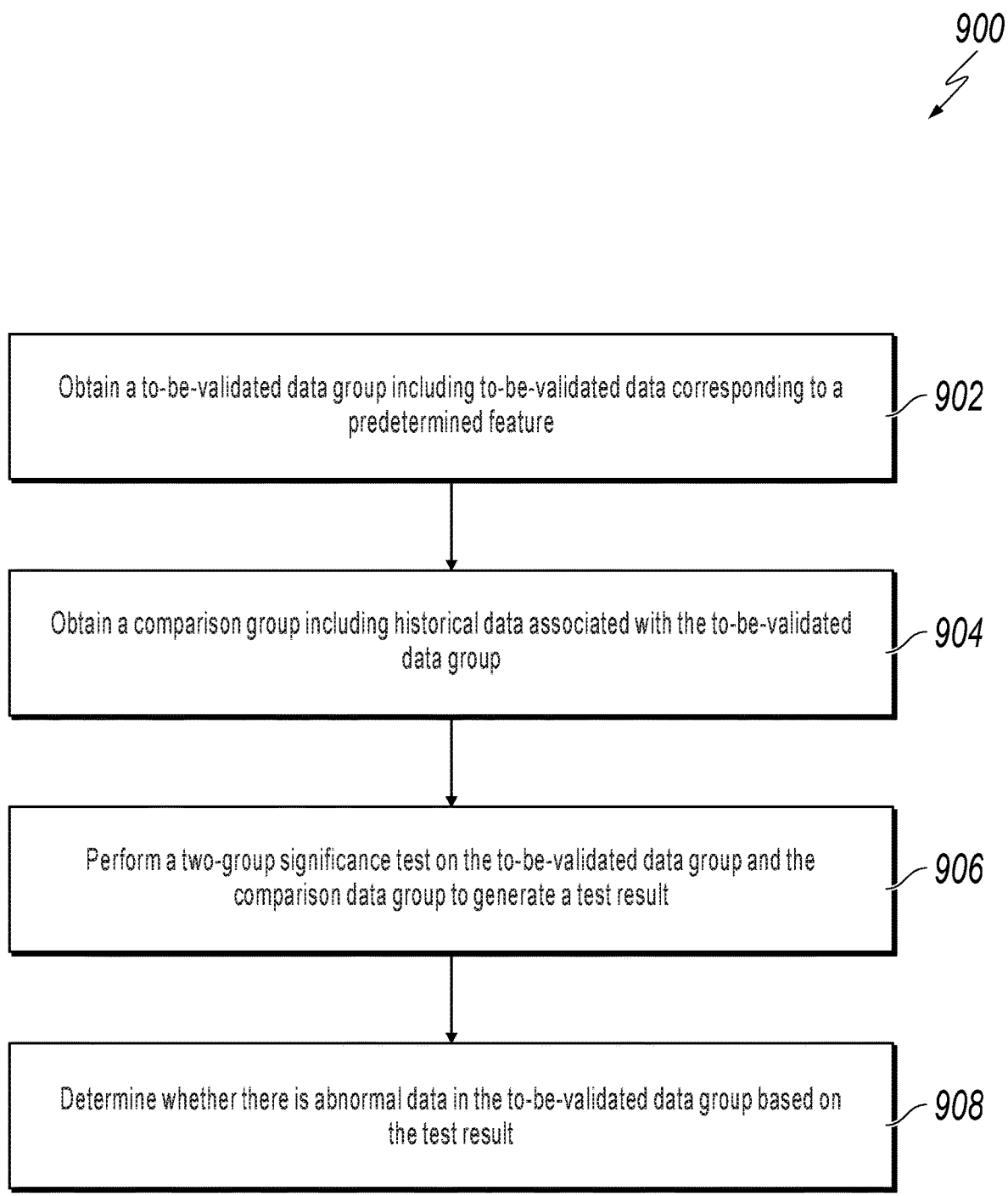
FIG. 9 is a flowchart illustrating an example of a computer-implemented method for determining abnormal data in a data group, according to an implementation of the present disclosure.

FIG. 9 is a flowchart illustrating an example of a computer-implemented method 900 for determining abnormal data in a data group, according to an implementation of the present disclosure. For clarity of presentation, the description that follows generally describes method 900 in the context of the other figures in this description. However, it will be understood that method 900 can be performed, for example, by any system, environment, software, and hardware, or a combination of systems, environments, software, and hardware, as appropriate. In some implementations, various steps of method 900 can be run in parallel, in combination, in loops, or in any order.

At 902, by a data processing platform, a to-be-validated data group including to-be-validated data corresponding to a predetermined feature is obtained In some implementations, the predetermined feature defines a type of numerical values within a predetermined range. From 902, method 900 proceeds to 904.

At 904, a comparison data group including historical data associated with the to-be-validated data group is obtained as a comparison data group, where the historical data and the to-be-validated data group are from a same data source.

In some implementations, obtaining the comparison data group including the historical data includes obtaining a number of groups of historical data associated with the to-be-validated data group; performing a two-group significance test on each of two groups of the historical data; and determining a group of the historical data that contains no abnormal data as the comparison data group based on a test result of the two-group significance test. From 904, method 900 proceeds to 906.

At 906, a two-group significance test is performed on the to-be-validated data group and the comparison data group to generate a test result. In some implementations, performing a two-group significance test includes determining a probability that a population mean associated with the to-be-validated data group is a same with a population mean associated with the comparison data group. In such implementations, it is determined that there is no abnormal data in in the to-be-validated data group if the determined probability is greater than 0.01%. From 906, method 900 proceeds to 908.

At 908, whether there is abnormal data in the to-be-validated data group is determined based on the test result.

In some implementations, if it is determined that the to-be-validated data group includes abnormal data method 900 further includes dividing the to-be-validated data group into a plurality of data groups as new to-be-validated data groups; performing the two-group significance test on each of the new to-be-validated data group and the comparison data group to generate a comparison result; and determining whether each new to-be-validated date group includes abnormal data based on the comparison result. After 908, method 900 stops.

Implementations of the present application can solve technical problems in processing data to detect abnormal data. In consideration of security and confidentiality, data service platforms, for example, financial platforms, perform privacy protection processing on their data before sending the data to other platforms for processing. However, because the processed data loses their service meaning, after the receiving platforms receives the data, it is difficult for them to determine whether there is abnormal data included in the received data based on the service rules. In addition, as data volume exponentially increases, the service rules change all the time. As such, identifying abnormal data by using only the service rules can cause heavy workload and incomprehensive identifications. What is needed is a technique to bypass these problems in the conventional methods, and providing a more secure and efficient solution for determining abnormal data in a data group during data processing.

Implementation of the present application provide methods and apparatuses for improving abnormal data detection in data processing. In some implementations, a processing platform (e.g., an payment processing server) obtains data that is to be validated and that corresponds to a predetermined feature from a data providing platform as a data group that is to be validated (e.g., a data group that corresponds to user transaction amounts). In addition, the processing platform can further obtains historical data of the data that is to be validated as a comparison data group. The historical data may also corresponds to the same predetermined feature, and the comparison data group can be provided by the data providing platform in advance. Then, the processing platform performs a two-group significance test on the data group that is to be validated and the comparison data group, and determines whether there is abnormal data based on a test result. If there is no abnormal data, the processing platform can continue to process the data or send the data to a next service step. If the processing platform determines that there is abnormal data, the processing platform can start alerting, instruct related persons to analyze the cause of the data exception, and trigger related solutions.

Implementations of this specification produce several technical effects. For example, in the case where data providing platforms encrypt the data before sending it to the processing platforms, the present application provides a solution to check the received data and determine whether there is abnormal data, that is, data includes null values and outliers. In addition, performing the two-group significance test on the historical data further ensures normality of the comparison data group, and therefore abnormality validation of the data group that is to be validated can be more accurate. Further, while directly transferring the data group that is to be validated to manual check upon determining that there is abnormal data in the data group causes heavy workload, in the described solution, the data group that is to be validated is divided into, for example, four groups as new data groups that are to be validated, and then the significance test is performed. As such, a new data group that is to be validated and that has abnormal data can be determined. A data magnitude of the new data group that is to be validated is reduced.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining, by a data processing platform and from a second data platform, a to-be-validated data group including to-be-validated data corresponding to a predetermined feature, wherein the second data platform collects initial data and modifies the initial data by an encryption process that encrypts the initial data to generate the to-be-validated data;
   performing, by the data processing platform, a data preprocessing operation on the to-be-validated data group, comprising
       dividing the to-be-validated data group into a plurality of to-be-validated sub data groups each having a smaller size than that of the to-be-validated data group, and using one of the to-be-validated sub data group as the to-be-validated data group, or
       transforming data in the to-be-validated data group to have a predefined distribution by performing a corresponding data transformation on the data based on a distribution feature of the data;

obtaining, by the data processing platform, a comparison data group including historical data associated with the to-be-validated data group, wherein the historical data and the to-be-validated data are from a same data source;

performing, by the data processing platform, a two-group significance test on the to-be-validated data group and the comparison data group to generate a test result that is indicative of a degree of difference between the to-be-validated data group and the comparison data group;

determining, by the data processing platform, that there is abnormal data in the to-be-validated data group based on the test result;

in response, dividing, by the data processing platform and according to a predetermined data division rule, the to-be-validated data group into a plurality of to-be-validated sub data groups;

performing, by the data processing platform, the two-group significance test on each to-be-validated sub data group of the plurality of to-be-validated sub data groups and the comparison data group to generate new test results; and determining, by the data processing platform, whether each to-be-validated sub data group includes abnormal data based on the new test results.

2. The computer-implemented method of claim 1, wherein obtaining the comparison data group including the historical data includes:
   obtaining a plurality of groups of historical data associated with the to-be-validated data group;
   performing a two-group significance test on each of two groups of the historical data; and
   determining a group of the historical data that contains no abnormal data as a comparison data group based on a test result of the two-group significance test.

3. The computer-implemented method of claim 1, wherein the predetermined feature defines a type of numerical values within a predetermined range.

4. The computer-implemented method of claim 1, wherein performing a two-group significance test includes determining a probability that a population mean associated with the to-be-validated data group is a same with a population mean associated with the comparison data group.

5. The computer-implemented method of claim 4, wherein it is determined that there is no abnormal data in in the to-be-validated data group if the probability is greater than 0.01%.

6. The computer-implemented method of claim 1, wherein the predefined distribution is a normal distribution, and wherein the corresponding data transformation comprises one or more of a logarithmic transformation, a square root transformation, a reciprocal transformation, or an arcsine square root transformation.

7. A non-transitory, computer-readable medium storing one or more instructions executable by a computer system to perform operations comprising:
   obtaining, by a data processing platform and from a second data platform, a to-be-validated data group including to-be-validated data corresponding to a predetermined feature, wherein the second data platform collects initial data and modifies the initial data by an encryption process that encrypts the initial data to generate the to-be-validated data;

performing, by the data processing platform, a data pre-processing operation on the to-be-validated data group, comprising
   dividing the to-be-validated data group into a plurality of to-be-validated sub data groups each having a smaller size than that of the to-be-validated data group, and using one of the to-be-validated sub data group as the to-be-validated data group, or
   transforming data in the to-be-validated data group to have a predefined distribution by performing a corresponding data transformation on the data based on a distribution feature of the data;

obtaining, by the data processing platform, a comparison data group including historical data associated with the to-be-validated data group, wherein the historical data and the to-be-validated data are from a same data source;

performing, by the data processing platform, a two-group significance test on the to-be-validated data group and the comparison data group to generate a test result that is indicative of a degree of difference between the to-be-validated data group and the comparison data group;

determining, by the data processing platform, that there is abnormal data in the to-be-validated data group based on the test result;

in response, dividing, by the data processing platform and according to a predetermined data division rule, the to-be-validated data group into a plurality of to-be-validated sub data groups;

performing, by the data processing platform, the two-group significance test on each to-be-validated sub data group of the plurality of to-be-validated sub data groups and the comparison data group to generate new test results; and determining, by the data processing platform, whether each to-be-validated sub data group includes abnormal data based on the new test results.

8. The non-transitory, computer-readable medium of claim 7, wherein obtaining the comparison data group including the historical data includes:
   obtaining a plurality of groups of historical data associated with the to-be-validated data group;
   performing a two-group significance test on each of two groups of the historical data; and
   determining a group of the historical data that contains no abnormal data as a comparison data group based on a test result of the two-group significance test.

9. The non-transitory, computer-readable medium of claim 7, wherein the predetermined feature defines a type of numerical values within a predetermined range.

10. The non-transitory, computer-readable medium of claim 7, wherein performing a two-group significance test includes determining a probability that a population mean associated with the to-be-validated data group is a same with a population mean associated with the comparison data group.

11. The non-transitory, computer-readable medium of claim 10, wherein it is determined that there is no abnormal data in in the to-be-validated data group if the probability is greater than 0.01%.

12. The non-transitory, computer-readable medium of claim 7, wherein the predefined distribution is a normal distribution, and wherein the corresponding data transformation comprises one or more of a logarithmic transformation, a square root transformation, a reciprocal transformation, or an arcsine square root transformation.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a data processing platform and from a second data platform, a to-be-validated data group including to-be-validated data corresponding to a predetermined feature, wherein the second data platform collects initial data and modifies the initial data by an encryption process that encrypts the initial data to generate the to-be-validated data;
performing, by the data processing platform, a data preprocessing operation on the to-be-validated data group, comprising
dividing the to-be-validated data group into a plurality of to-be-validated sub data groups each having a smaller size than that of the to-be-validated data group, and using one of the to-be-validated sub data group as the to-be-validated data group, or
transforming data in the to-be-validated data group to have a predefined distribution by performing a corresponding data transformation on the data based on a distribution feature of the data;
obtaining, by the data processing platform, a comparison data group including historical data associated with the to-be-validated data group, wherein the historical data and the to-be-validated data are from a same data source;
performing, by the data processing platform, a two-group significance test on the to-be-validated data group and the comparison data group to generate a test result that is indicative of a degree of difference between the to-be-validated data group and the comparison data group;
determining, by the data processing platform, that there is abnormal data in the to-be-validated data group based on the test result;
in response, dividing, by the data processing platform and according to a predetermined data division rule, the to-be-validated data group into a plurality of to-be-validated sub data groups;
performing, by the data processing platform, the two-group significance test on each to-be-validated sub data group of the plurality of to-be-validated sub data groups and the comparison data group to generate new test results; and
determining, by the data processing platform, whether each to-be-validated sub data group includes abnormal data based on the new test results.

14. The computer-implemented system of claim 13, wherein obtaining the comparison data group including the historical data includes:
obtaining a plurality of groups of historical data associated with the to-be-validated data group;
performing a two-group significance test on each of two groups of the historical data; and
determining a group of the historical data that contains no abnormal data as a comparison data group based on a test result of the two-group significance test.

15. The computer-implemented system of claim 13, wherein performing a two-group significance test includes determining a probability that a population mean associated with the to-be-validated data group is a same with a population mean associated with the comparison data group.

16. The computer-implemented system of claim 15, wherein it is determined that there is no abnormal data in in the to-be-validated data group if the probability is greater than 0.01%.

17. The computer-implemented system of claim 13, wherein the predefined distribution is a normal distribution, and wherein the corresponding data transformation comprises one or more of a logarithmic transformation, a square root transformation, a reciprocal transformation, or an arcsine square root transformation.

\* \* \* \* \*